(12) United States Patent
Urfer et al.

(10) Patent No.: US 11,897,069 B2
(45) Date of Patent: Feb. 13, 2024

(54) DEVICE FOR STABILIZING A WORKPIECE IN A MACHINE TOOL

(71) Applicant: GF Machining Solutions AG, Langnau i.E. (CH)

(72) Inventors: Christoph Urfer, Thun (CH); Andreas Scheidegger, Konolfingen (CH); Ernst Haueter, Bowil (CH)

(73) Assignee: GF Machining Solutions AG

( * ) Notice: Subject to any disclaimer, the term of this patent is extended or adjusted under 35 U.S.C. 154(b) by 172 days.

(21) Appl. No.: 17/453,262

(22) Filed: Nov. 2, 2021

(65) Prior Publication Data

US 2022/0134496 A1 May 5, 2022

(30) Foreign Application Priority Data

Nov. 4, 2020 (EP) .................................... 20205681

(51) Int. Cl.
| | |
|---|---|
| *B23Q 3/06* | (2006.01) |
| *B23Q 1/56* | (2006.01) |
| *B23Q 3/08* | (2006.01) |

(52) U.S. Cl.
CPC .............. *B23Q 3/063* (2013.01); *B23Q 1/56* (2013.01); *B23Q 3/082* (2013.01); *B23Q 2703/04* (2013.01)

(58) Field of Classification Search
CPC .......... B23Q 1/035; B23Q 1/037; B23Q 3/02; B23Q 3/062; B23Q 3/065; B23Q 3/082
See application file for complete search history.

(56) References Cited

U.S. PATENT DOCUMENTS

| | | | | |
|---|---|---|---|---|
| 5,562,276 A | * | 10/1996 | Blick ..................... | B23Q 1/037 269/21 |
| 6,089,061 A | * | 7/2000 | Haas ..................... | B21D 37/16 72/413 |
| 2018/0119766 A1 | * | 5/2018 | Twelves, Jr. ............ | F16F 7/015 |

FOREIGN PATENT DOCUMENTS

| | | | | |
|---|---|---|---|---|
| DE | 19745145 A1 | * | 4/1998 | ............. B21J 15/10 |
| DE | 202010008628 U1 | | 12/2011 | |
| EP | 0739672 A2 | | 10/1996 | |
| EP | 0899061 A2 | | 3/1999 | |
| GB | 2458738 A | | 10/2009 | |

OTHER PUBLICATIONS

Extended European Search Report dated Apr. 20, 2021 for Application No. 20205681.8 (8 pages).

* cited by examiner

*Primary Examiner* — Tyrone V Hall, Jr.
(74) *Attorney, Agent, or Firm* — Harness, Dickey & Pierce, P.L.C.

(57) ABSTRACT

A device for stabilizing a workpiece, in particular a thin-walled workpiece mounted in a machine tool, comprises at least one base; and a plurality of stabilizing elements. The stabilizing elements protrude away from one surface of the base, wherein the stabilizing element comprises a cylinder and a rod arranged therein and the rod can be driven hydraulically to move in the axial direction of the stabilizing element such that the rod of at least two of the stabilizing elements can be brought into contact with one surface of the workpiece.

16 Claims, 4 Drawing Sheets

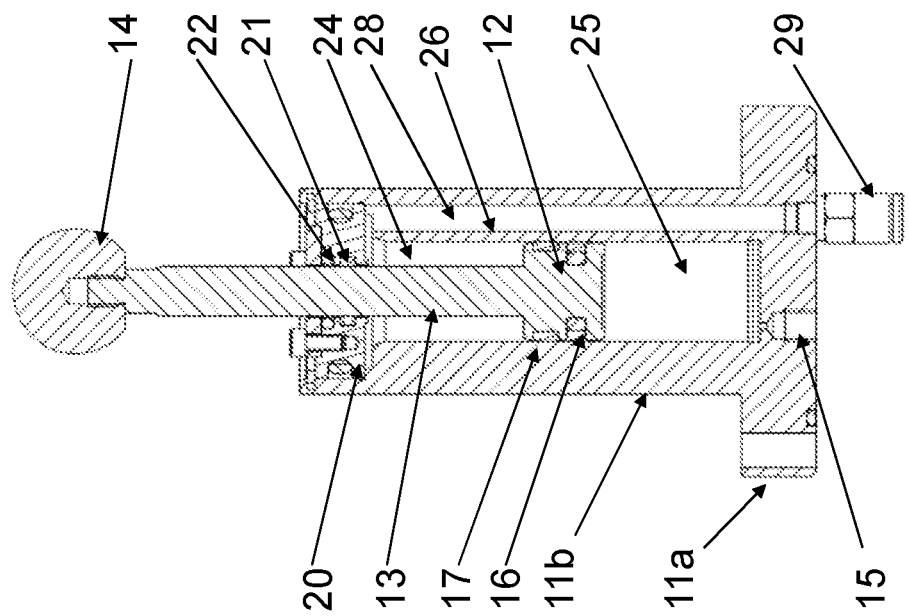
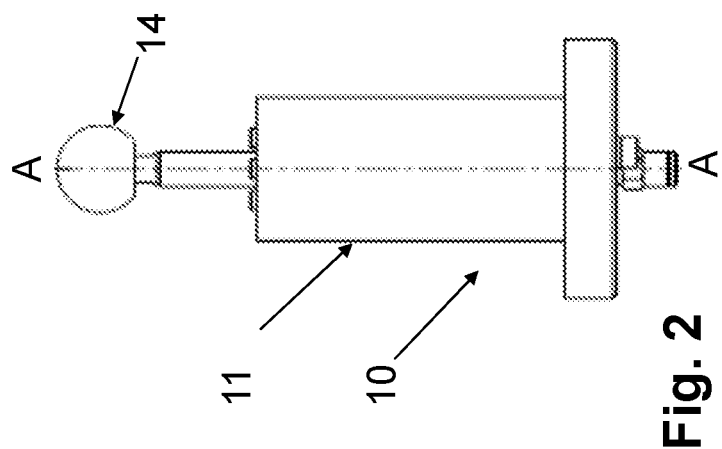

DEVICE FOR STABILIZING A WORKPIECE IN A MACHINE TOOL

CROSS-REFERENCE TO RELATED APPLICATIONS

This application claims the benefit and priority of European Patent Application No. 20 205 681.8 filed Nov. 4, 2020. The entire disclosure of the above application is incorporate herein by reference.

BACKGROUND OF THE INVENTION

Technical Field

The present invention is related to a device for stabilizing a workpiece mounted in a machine tool. In further, the present invention relates to a machine tool including a device for stabilizing a workpiece to be machined by the machine tool.

Discussion

Machine tools have the importance of reliable and accurate cutting, in particular, in cutting high performance alloys for aerospace components. However, machining thin-walled components for aerospace application can be challenging, since during the machining the milling cutting forces can generate deflection of the workpiece. Another problem is the vibrations in the machining. If the components such as turbine blades are thin and has an elongated shape, the deflection and vibration can considerably reduce the quality of the machined components. The deflection can cause dimensional surface error and the vibration can even result in the damage of the machined part.

In some applications, the workpiece has a hollow or at least partially hollow body. Thus, the risk of damaging the workpiece during machining due to deflection and vibration is even higher. The surface quality of such blade decreases dramatically, if the workpiece to be machined not optimally supported.

EP 2618961 discloses a device for processing elongated workpieces. The device comprises a first clamping point for clamping a first end of the workpiece and a second clamping point for clamping a second end of the workpiece. In addition, a steady rest is provided to support the workpiece and the steady rest is movable along a longitudinal axis of the workpiece.

However, the workpiece is not supported over the whole area and the deflection generated on the workpiece due to cutting force can not be restrained.

SUMMARY OF THE INENTION

It is an aspect of this invention to provide a device to stabilize a workpiece mounted in the machine tool and to be machined thereby. It is a further objective of this invention to provide a device to support a thin-walled workpiece machined by a machine tool having damping function.

According to the present invention, these objectives are achieved through the features of independent claims. In addition, further advantageous embodiments follow from the dependent claims and the description.

According to the present invention, a device for stabilizing a workpiece, in particular a thin-walled workpiece mounted in a machine tool, comprises a base and a plurality of stabilizing elements protruding away from one surface of the base. In one variant, at least ten stabilizing elements are provided, preferably at least 20 stabilizing elements distributed at least at two rows. The stabilizing element comprises a cylinder and a rod arranged therein and the rod can be hydraulically driven to move in the axial direction of the stabilizing element such that the rod of at least two stabilizing elements can be brought into contact with one surface of the workpiece. The base is made of a material, which provide high mechanical stability, for example AlMgSi1 MN. The base has an elongated body. The length of the body is preferably larger than the height of the body.

By machining thin-walled part to obtain, e.g. a turbine blade, roughing and finishing are required. For milling the workpiece it is clamped in a machine tool at each end in a horizontal direction, while a milling tool is mounted in the spindle of the machine tool to remove the material. After the roughing, most of material has been removed and the workpiece normally has an elongated body with very thin wall. During the finishing, the desired contour surface can be achieved. In this phase, the workpiece must be stably clamped in the machine tool. However, the workpiece is normally only clamped at the both ends in the machine tool. If the workpiece is very thin, high cutting force acted on the workpiece can deflect the workpiece locally. In order to avoid possible deflection, ideally the whole surface of the workpiece should be supported.

The device for stabilizing the workpiece can therefore be placed e.g. below the workpiece and closely to one surface of the workpiece to avoid a large distance between the workpiece and the device. The device is also clamped on the both ends by the clamping means used for clamping the workpiece or by a different clamping means. The stabilizing elements are approximately vertically arranged on the surface of the base to be moveable in the axial direction of the stabilizing element to reach the surface of the workpiece. The stabilizing elements are not locked in one position during the machining. The movement of the stabilizing elements in the axial direction can damp the local vibration through the friction of the flow of the oil.

In one embodiment, the stabilizing elements are driven hydraulically and controlled in a way that all the stabilizing elements can be brought into contact with the surface of the workpiece, when the workpiece and the device are mounted in the machine tool. When the fluid e.g. oil is supplied to each stabilizing element, the rod is pushed by the fluid to extend out of the cylinder.

In a preferred embodiment, the stabilizing element can be pneumatically driven to move in the axial direction of the stabilizing element. This function enables the rod to be pushed back to an initial position, which is located at the bottom of the cylinder. For example, for mounting and/or dismounting the device and the workpiece into and/or from the machine tool, it is more convenient for the handling to retain the rods at this initial position.

In order to benefit from this advantage, in this preferred embodiment, the device comprises two bases, a first base and a second base. A first group of the plurality of the stabilizing elements are arranged on the first base and a second group of the plurality of the stabilizing elements are arranged on the second base.

When the device is clamped in the machine tool, the workpiece is positioned between two bases and two groups of stabilizing elements. The stabilizing elements are driven hydraulically and controlled in a way that the first group of stabilizing elements can be brought into contact with a first surface of the workpiece and the second group of stabilizing elements can be brought into contact with a second surface of the workpiece. In particular, the second surface of the workpiece is on the opposite side of the first surface of the workpiece. Moreover, the first group of stabilizing elements and the second group of stabilizing elements are hydraulically connected together. Thus, the hydraulic fluid supplied into the first group of the stabilizing elements can flows into the second group of stabilizing elements and vice versa to stabilize the workpiece from both sides.

If the stabilizing elements are symmetrically distributed on the surface of the base. The workpiece can be supported homogeneously over the whole surface. However, the stabilizing elements can also be arranged in an irregular manner to provide the optimal support. For example, depending on the shape and weight variation at different position, certain area of the workpiece require a stronger support than the other area of the workpiece.

The stabilizing element comprises a cylinder and a piston arranged therein, which is driven hydraulically to reciprocate in the cylinder.

In further, the rod is mounted on the piston and the rod can be moved in a position that one end thereof stands out of the cylinder. Preferably, the rod and the piston are formed in one part.

In order to ensure a damping and to avoid high pressure at one point of the workpiece a rod head is mounted on the top of the rod and the rod head is made of elastic material, in particular the cap has a ball shape.

The interior of the cylinder is divided by the piston into an upper chamber and a lower chamber. For hydraulic drive, a fluid is supplied to each stabilizing element through an inlet provided on the cylinder connected to the lower chamber, in particular from the bottom of the cylinder. Such arrangement has the advantage of simple construction. However, the fluid can also be supplied into the cylinder through an inlet on the side surface of the cylinder but below the piston. When the fluid is supplied into the lower chamber of the cylinder, the piston and the rod connected thereto are pushed upwards by the fluid to move in the axial direction. The inlet is designed to throttle the hydraulic fluid flowing out of the cylinder when the stabilizing element is brought into contact with the surface of the workpiece, in particular, the inlet has a funnel shape. The side of the inlet in the lower chamber of the cylinder has a smaller diameter than the side of the inlet supplying the fluid. However, the fluid can flow between the stabilizing elements to adjust the position of the rod of the stabilizing elements to compensate the deflection of the workpiece.

A ventilation means is operationally connected to the upper chamber of the cylinder to force the piston to move to the initial position. When the ventilation means is activated, air can be supplied from the ventilation means to the upper chamber to force the piston to move to the bottom of the cylinder.

For some application, in particular machining thin-walled workpiece, it is advantageous to design the top surface of the base having a curved shape, in particular having similar shape as the surface of the workpiece. In a preferred variant, the base has an elongate body.

In order to reduce the total weight of the device without compromising the mechanical stability of the device, a recess is formed in the interior of the base. Additionally, the recess provides the space for accommodating all fluid and air supplying circuit to obtain a compact design.

In one variant, all the stabilizing elements have the same dimension, such as the length of the rod, the diameter of the cylinder. In another variant, stabilizing elements having different dimensions are mounted to adapt the shape of the workpiece and the force acted on the workpiece at different positions.

An automatic clamping element is attached on the surface of the base opposite to the surface, on which the stabilizing elements are provided to automatically mounting and/or dismounting the device into the machine tool, for example by a robot.

The device further comprises two slave clamping means attached to the two distal ends of the base for mounting the device into the machine tool. The slave clamping means is a pneumatic clamping system, preferably a zero-point clamping system.

The present invention is directed to a machine tool comprising a master clamping means to clamp the device in the machine tool. A first fluid channel for supplying hydraulic fluid and a second fluid channel for supplying air are embedded in the master clamping means and the master clamping means can be coupled to the slave clamping means of the device.

On each base, two slave clamping means are provided on the two ends of the base for clamping the device into the machine tool. The main inlets for supplying the hydraulic fluid and pneumatic fluid are embedded in the slave clamping means.

In one variant, the slave clamping means and the base are formed in one piece.

Fluid channels for supplying the hydraulic fluid and the pneumatic fluid are embedded in the master clamping means. The device is clamped through the 0-point clamp connector to the master clamping means. By mounting the device into the machine tool, through the slave clamping means and the master clamping means, the fluid channels in the master clamping means are coupled directly to the main inlets embedded in the slave clamping means.

In further, the hydraulic fluid supplied into the first group of stabilizing elements can flows into the second group of stabilizing elements or vice versa, since the main inlets for the first base and the second base can be connected through the fluid channels in the master clamping means.

BRIEF DESCRIPTION OF THE DRAWINGS

A more particular description of the principles briefly described above will be rendered in the following by reference to specific embodiments thereof, which are illustrated in the drawings. These drawings illustrate exemplary embodiments of the disclosure and are not therefore to be considered to limit its scope. The principles of the disclosure are described and explained with details through the use of the accompanying drawings in which:

FIG. 2 illustrates a front view of the stabilizing element;
FIG. 3 illustrates a section view of the stabilizing element.

EXEMPLARY EMBODIMENTS

Figure 1:
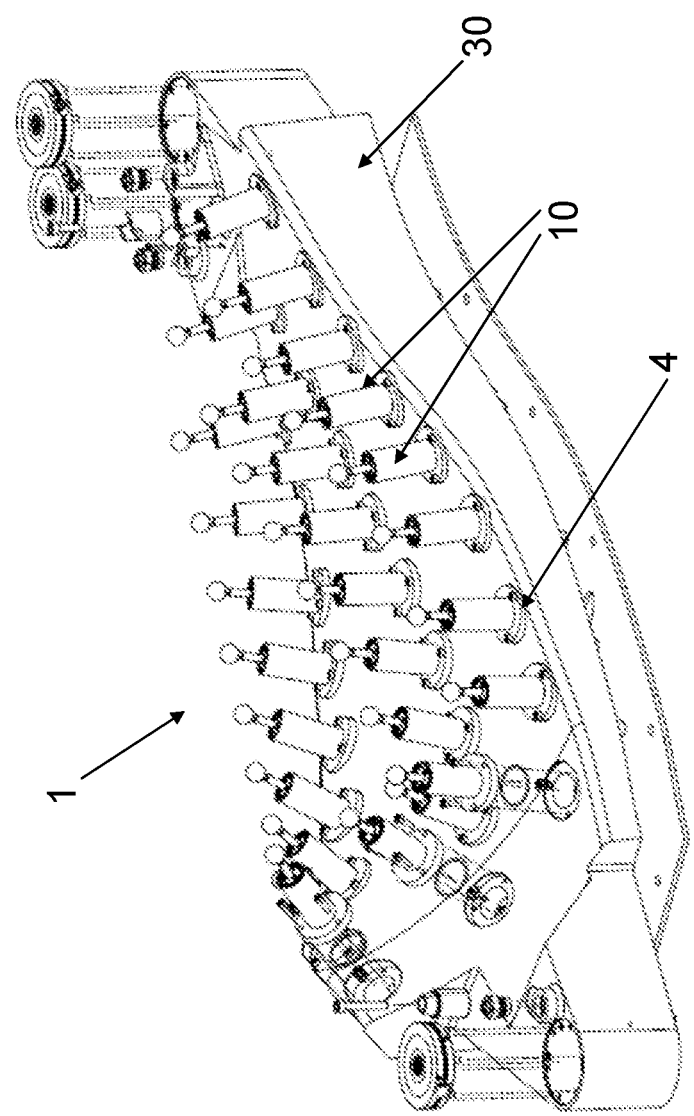
FIG. 1 illustrates a device for supporting a workpiece.

FIG. 1 illustrates a device 1 for stabilizing a workpiece, which is in particular a thin-walled workpiece mounted in a machine tool. In order to machine the thin-walled workpiece it must be stably clamped in the machine tool. The device comprises a base 10 and a plurality of stabilizing elements 10 fixedly mounted on the top surface of the base. In this embodiment, the base has an elongated body and a curved top surface to adapt the shape to the workpiece. By this way, supporting force vertically to the surface of the workpiece can be acted by the stabilizing element. On the top surface of the base, a plurality of holes 4 are provided and each hole receives one stabilizing element. In order to accommodate assemblies for supplying hydraulic and pneumatic fluid into the stabilizing element, the base is designed to be at least partially hollow.

In this embodiment, the stabilizing elements are provided at three rows. On the each row, more than four stabilizing elements are provided to be able to stabilize a workpiece having a relative larger surface. FIG. 1 shows an example that all the stabilizing elements have the same dimension.

The structure of the stabilizing element is shown in detail in FIGS. 2 and 3. FIG. 3 is a section view of along the A-A line. Each stabilizing element comprises a cylinder 11 and a piston 12. The cylinder has a tubular shape and two portions formed in one part. The lower portion is a cylinder base 11a for stably mounting the cylinder on the base of the device by fixing means. The upper portion 11b is cylinder body to accommodate the piston therein and stands upwards on the base 30. A piston 12 and a rod 13 formed in one integrated part are arranged in the hollow space inside of the cylinder body to be able to move in the axial direction of the cylinder. The piston and the rod are formed in one single part but have different diameters. The diameter of the piston is designed to correspond to the inner diameter of the cylinder. A piston guide ring 17 and a piston sealing means 16 are provided on the piston. The piston guide ring serves to avoid the mechanical contact between the piston and the inner surface of the cylinder and reduce the lateral force. On the upper part of the interior of the cylinder, a cylinder cap 20 is fixedly mounted on the inner surface of the cylinder to form a closed inner space in the cylinder. The rod protrudes from a through hole in the middle of the cylinder cap. A rod guide ring 22 and a rod sealing means 21 are arranged in a recess formed on the inner surface of the cylinder cap. A rod head 14 having a ball shape is mounted on the top of the rod to be brought into directly contact with the workpiece being machined. The rod head can be made of elastic material. An inlet opening 15 is provided on the cylinder base for supplying the hydraulic fluid into the interior of the cylinder to enable the piston to reciprocate in the axial direction of the cylinder. The interior of the cylinder is divided by the piston into a lower chamber 25 and an upper chamber 24. The rod is arranged in the upper chamber. The hydraulic fluid is received in the lower chamber and push the piston move into the direction of the workpiece.

Before the machining, a ventilating means, e.g. a nozzle is activated to force the piston to be pushed to an initial position, this means the piston moves to the bottom of the lower chamber on the side of the cylinder base by the air pressure. The ventilating means includes an air chamber 28, which is communicably connected to the upper chamber 24 of the cylinder and separated from the low chamber and upper chamber by a separating means 26, for example a wall. The air chamber can be closed by a closing means. The device is mounted in the machine tool by keeping the piston of all stabilizing elements in the initial position. After the device is mounted in the machine tool and the workpiece is mounted above the device, the ventilating means is deactivated and the lower chamber of all cylinders are supplied by hydraulic fluid to push the piston in the direction of the workpiece. The piston is pushed by the hydraulic fluid in the axial direction to bring the rod head into contact with the surface of the workpiece. When at least a part of rod heads contact the workpiece, the valve to supply the fluid is closed. During the machining, the at least a part of the pistons can be moveable to adapt to the shape variation of the workpiece due to the force generated by the machining tool thereon. After the machining, the pistons are forced to move back to the initial position by activating the ventilating means to dismount the device from the machine tool.

Figure 4:
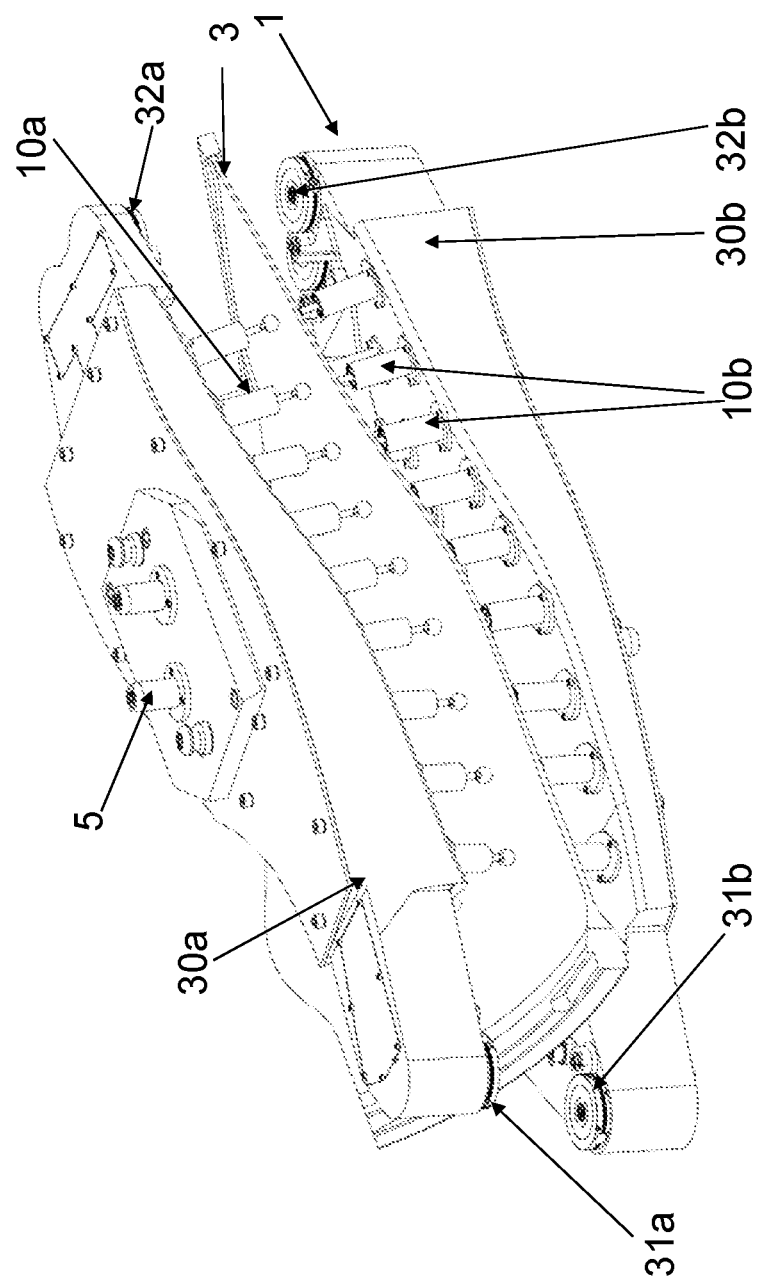
FIG. 4 illustrates one embodiment of the device.

FIG. 4 depicts an embodiment to stabilize the workpiece from both sides, from the top side of the workpiece and from the bottom side of the workpiece. The device has a first base 30a and a second base 30b. An automatic clamping element 5 is provided one the bottom of the base, namely the opposite side of arranging the stabilizing elements. The automatic clamping element serves for loading the device by a robot. In this configuration, the stabilizing elements of a first group 10a are driven to move downwards to stabilize the workpiece from the top, while the stabilizing elements of a second group 10b are driven to move upwards to stabilize the workpiece from the bottom. On each base, two slave clamping means 31a, 32a, 31b, and 32b are provided on the end of the base for clamping the device into the machine tool. The main inlets for supplying the hydraulic fluid and pneumatic fluid are embedded in the slave clamping means.

Figure 5:
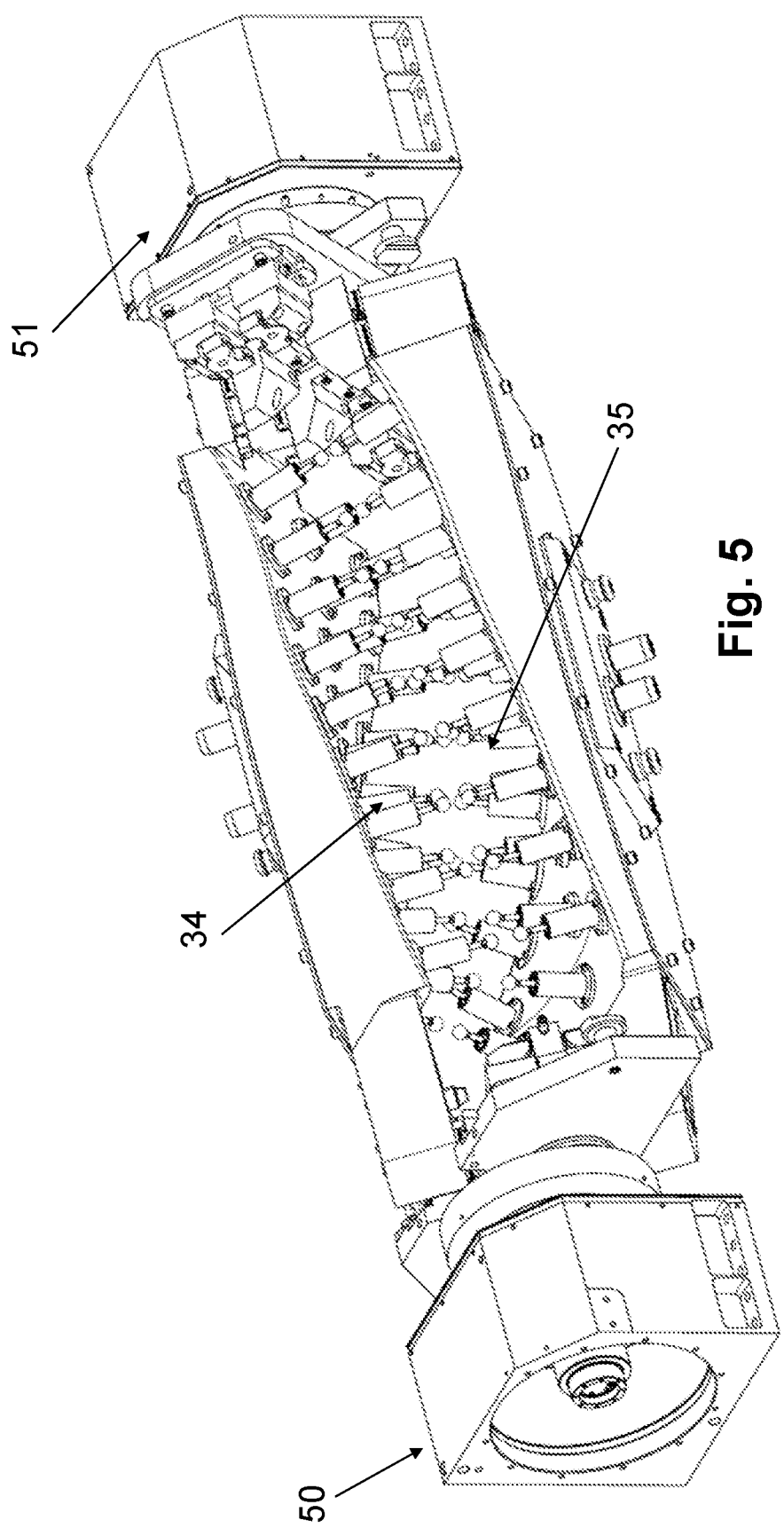
FIG. 5 illustrates the device mounted in a machine tool.

FIG. 5 shows the status in that the device is clamped in the masterclamping means 50, 51 of the machine tool. Fluid channels for supplying the hydraulic fluid and the pneumatic fluid are embedded in the master clamping means but is not visible in FIG. 5. The device is clamped through the 0-point clamp connector to the master clamping means. By mounting the device into the machine tool, through the slave clamping means and the master clamping means, the fluid channels in the master clamping means are coupled directly to the main inlets embedded in the slave clamping means.

In further, the hydraulic fluid supplied into the first group of stabilizing elements can flows into the second group of stabilizing elements or vice versa, since the main inlets for the first base and the second base can be connected through the fluid channels in the master clamping means.

In this embodiment, the hydraulic fluid is supplied into the fluid channel in the master clamping means and then distributed into the first group of the stabilizing element through the first main inlet in the first slave means and into the second group of the stabilizing elements through the second main inlet in the second slave means. If during the machining, the force from the workpiece acting on one or more stabilizing elements in the first group are increased, the hydraulic fluid flows out of the lower chamber of the cylinder of these stabilizing elements of the first group and flow further into the stabilizing elements of the second group to adjust the position of the piston of stabilizing elements of the second group.

What is claimed is:
1. A device (1) for stabilizing a workpiece, in particular a thin-walled workpiece (4) mounted in a machine tool, comprising:
 a. at least one base (30); and
 b. a plurality of stabilizing elements (10) protruding away from one surface of the base, wherein the stabilizing element comprises a cylinder and a rod arranged therein and the rod can be driven hydraulically to move in the axial direction of the stabilizing element such that the rod of at least two of the stabilizing elements can be brought into contact with one surface of the workpiece; and the stabilizing elements being configured to be movable while remaining contacting the workpiece during machining of the workpiece to adapt the stabilizing elements to shape variations of the workpiece.

2. The device according to claim 1, wherein the stabilizing element can be pneumatically driven to move in the axial direction of the stabilizing element.

3. The device according to claim 1, wherein the device comprises a first base (30a) and a second base (30b) and a first group of the plurality of the stabilizing elements (10a) arranged on the first base (31) and a second group of the plurality of the stabilizing elements (10b) arranged on the second base (32).

4. The device according to claim 3, wherein when the device is mounted in the machine tool, the stabilizing elements are driven hydraulically and controlled in a way that the first group of stabilizing elements can be brought into contact with a first surface of the workpiece and the second group of stabilizing elements can be brought into contact with the second surface of the workpiece, which is the opposite surface of the first surface of the workpiece.

5. The machine tool according to claim 3 wherein hydraulic fluid is directed through the first group of stabilizing elements and then through the second group of stabilizing elements whereby hydraulic fluid flows from the first group of stabilizing elements to the second group of stabilizing elements to change the position of the piston of the stabilizing elements of the second group as a result of changes in force from the workpiece on the first group of stabilizing elements.

6. The device according to claim 1, wherein on each base the stabilizing elements are distributed on the surface of the base with equal distances to each other.

7. The device according to claim 1, wherein the stabilizing element comprises a piston (12) arranged inside the cylinder and the rod is mounted thereon to follow the movement of the piston.

8. The device according to claim 7, wherein the piston can be hydraulically pushed into a position that one end of the rod stands out of the cylinder, in particular, a rod head (14) is provided on the top of the rod and can be brought into a direct contact with one surface of the workpiece.

9. The device according to claim 1, wherein an opening (15) is formed on a wall of the cylinder, in particular on the bottom of the cylinder for supplying a hydraulic fluid, in particular oil into the cylinder to act an axial force on the piston.

10. The device according to claim 9, wherein the opening is configured to throttle the hydraulic fluid flowing out of the cylinder when the stabilizing element is brought into contact with the surface of the workpiece, in particular the opening has a funnel shape.

11. The device according to claim 1, wherein the interior of the cylinder is divided by the piston into an upper chamber and a lower chamber, and a ventilation means is operationally connected to the upper chamber and when the ventilation means is activated, air can be supplied from the ventilation means to the upper chamber to force the piston to move to the bottom of the cylinder.

12. The device according to claim 1, wherein the top surface of the base is configured to have a similar shape as the surface of the workpiece, in particular a curved shape.

13. The device according to claim 1, wherein a slave clamping means is provided on at least one end of the base for clamping the device into the machine tool.

14. The device according to claim 1, wherein an automatic clamping element is arranged on the surface of the base opposite to the surface on which the stabilizing elements are provided.

15. A machine tool comprising a master clamping means (50) to clamp the device according to claim 1 in the machine tool, wherein a first fluid channel for supplying the hydraulic fluid and a second fluid channel for supplying the air are embedded in the master clamping means.

16. The machine tool according to claim 15, wherein a main inlet for supplying the hydraulic fluid into the stabilizing elements is integrated in each slave clamping means and the first fluid channel in the master clamping means is directly coupled to the main inlet in the slave clamping means by mounting the device into the machine tool.

* * * * *